United States Patent [19]
Atsuta et al.

[11] Patent Number: 5,948,462
[45] Date of Patent: Sep. 7, 1999

[54] METHOD OF PREPARING LOW FAT SAUSAGE

[75] Inventors: Eiji Atsuta, Saitama; Maki Maeda, Tokyo; Kaoru Sato; Masami Kawanari, both of Saitama, all of Japan

[73] Assignee: Snow Brand Milk Products Co., Ltd., Sapporo, Japan

[21] Appl. No.: 08/809,609

[22] PCT Filed: Jun. 7, 1996

[86] PCT No.: PCT/JP96/01546

§ 371 Date: Mar. 25, 1997

§ 102(e) Date: Mar. 25, 1997

[87] PCT Pub. No.: WO97/04669

PCT Pub. Date: Feb. 13, 1997

[30] Foreign Application Priority Data

Jul. 28, 1995 [JP] Japan .................................. 7-212518

[51] Int. Cl.$^6$ .................................................. A23C 17/00
[52] U.S. Cl. ..................... 426/583; 426/656; 426/657; 426/652; 426/585; 426/105; 426/130; 426/646; 426/647; 426/641; 426/520; 426/522; 426/804

[58] Field of Search ...................................... 426/583, 656, 426/657, 652, 585, 41, 129, 130, 646, 647, 641, 105, 520, 522, 804

[56] References Cited

U.S. PATENT DOCUMENTS

| | | | |
|---|---|---|---|
| 4,168,322 | 9/1979 | Buckley et al. | 426/250 |
| 4,556,570 | 12/1985 | Brander et al. | 426/104 |
| 5,039,538 | 8/1991 | Tamaki et al. | 426/281 |
| 5,217,741 | 6/1993 | Kawachi et al. | 426/573 |
| 5,494,696 | 2/1996 | Holst et al. | 426/583 |

*Primary Examiner*—Lila Feisee
*Assistant Examiner*—Eliane Lazar-Wesley
*Attorney, Agent, or Firm*—Burgess, Ryan & Wayne

[57] ABSTRACT

A method of preparing low fat sausage having a juicy feeling is provided by adding heat-denatured whey protein and emulsified composition comprising heat-denatured whey protein and edible oil and fat to raw material meat for sausage.

The invention also provides low fat sausage which has the same meat structure and juicy feeling as usual sausage comprising animal fat such as hog fat and the like.

8 Claims, 4 Drawing Sheets

Breaking Strength

Ratio of oil area to total area infiltrated

Stability of Emulsified Composition

METHOD OF PREPARING LOW FAT SAUSAGE

This application is the US National stage of PCT JP96/01546 filed Jun. 7, 1996.

FIELD OF THE INVENTION

The present invention relates to a low fat sausage and a preparing method thereof. More specifically, it relates to low fat sausage which has the same food texture and juicy feeling as conventional sausage by combining heat-denatured whey protein and emulsified composition comprising heat-denatured whey protein and edible oil and fat in place of hog fat and/or beef tallow and which contains a lower amount of fat than conventional sausage.

BACKGROUND OF THE INVENTION

As public concern is recently directed to health, the prevention of excessive calorie intake, obesity or diseases of adult people is regarded as serious. Demand for foods with a reduced amount of animal fat is being enhanced. However, when the amount of fat in sausage was simply reduced, it was inevitable not only that flavor thereof became worse but also that juicy feeling specific to sausage was lost and it became crumbly. Usual fat-rich sausages have good food texture and juicy feeling, that is, such a feeling as fat containing juice spread in the whole mouth. This can be explained by the fact that sausages contain 20–30% of fat such as hog fat and so on.

In Japanese published unexamined patent application No.112969/1989, though emulsion comprising edible oil and fat was used for substitution of animal fat, edible detergent was added so as to give its concentration of about 0.1–1% by weight for preparation of emulsion. That is, this concept was to use a stable emulsion. These stable emulsion affected meat structure of low fat sausages and could not make the sausages as juicy as sausage comprising the usual amount of fat.

In Japanese published unexamined patent application No.112770/1992, though mashed material of animal skin and water was used for substitution of fat, the meat structure of sausage was tight but crumbly and could not provide a juicy feeling, that is, such a feeling as fat containing juice spread throughout the whole mouth.

The present invention was aimed to overcome these defects of conventional low fat sausage. That is, an object of the present invention is to provide a novel sausage having the same meat structure and juicy feeling as usual sausage and a method of preparing such sausage.

More specifically, the present invention is to provide a novel low fat sausage which comprises heat-denatured whey protein, does not separate fat on heat treatment and has the same meat structure and juicy feeling as usual sausage comprising more than 20% of animal fat when it was heated and eaten and a preparing method thereof.

DISCLOSURE OF THE INVENTION

Considering these problems of the conventional technique, the present inventors eagerly investigated methods of preparing low fat sausage, found and that, when only heat-denatured whey protein was used for substitution of animal fat, produced sausage had the same properties lacking juicy feeling as that described in Japanese published unexamined patent application No. 112770/1992. They also found that a combination of heat-denatured whey protein with emulsified composition in an appropriately stable state of heat-denatured whey protein and edible oil and fat made low fat sausage having the same meat structure and juicy feeling as usual sausage comprising more than 20% of animal fat.

That is, the present invention relates to a method of preparing low fat sausage having a juicy feeling by combining heat-denatured whey protein with emulsified composition of heat-denatured whey protein and edible oil and fat, followed by adding it to red meat as the raw material of sausage.

Further, the present invention relates to low fat sausage having a juicy feeling which was produced as described above and have 40–85% of area ratio of oil component to total area of filter paper infiltrated by the juice component and determined by the following method:

First, sausage was boiled and sliced into 2 cm of thickness when the core temperature thereof cooled to 60° C. Then, a slice was put on a filter paper and loaded mechanically at 25–50 g/cm$^2$. The area ratio of oil component was represented as ratio of oil area to total area of filter paper infiltrated juice by the component.

Figure 3:
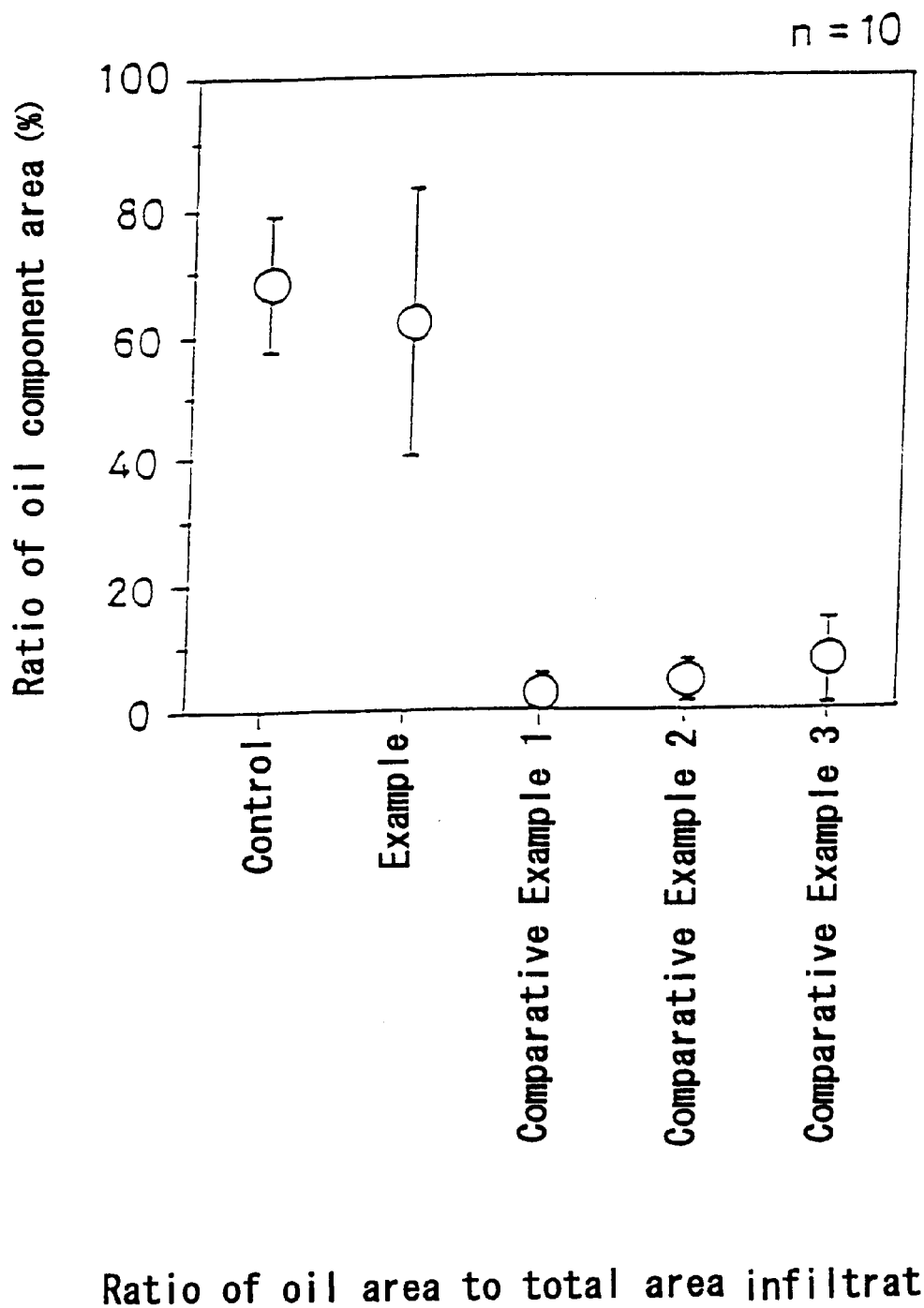

And, FIG. 3 exhibits a graph which compares area ratio of infiltrated oil of low fat sausage in example of the present invention with that of sausage in the comparative examples and that of sausage in the control group.

Figure 4:
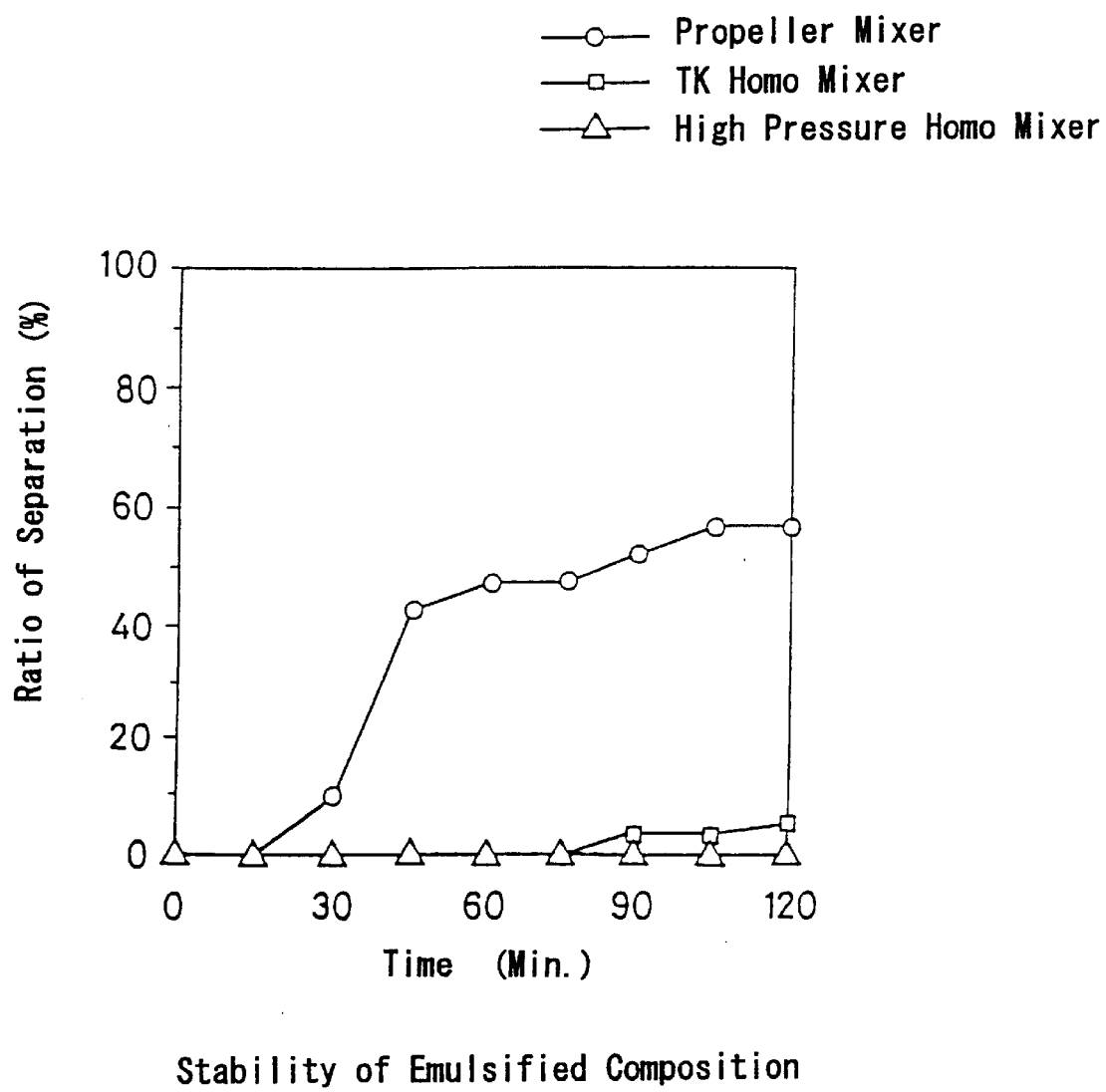

FIG. 4 exhibits a graph which shows stability of emulsified composition of the present invention as a function of time.

BEST MODE OR PREFERRED EMBODIMENT OF THE PRESENT INVENTION

As low fat red meat used as the raw material of the present invention, meat for foods such as pork, beef, chicken, mutton or fish meat can be used. Further, mixed meat with each other can be also used. Low fat red meat chosen as raw material can be sliced or ground, and mixed with heat-denatured whey protein solution or dried powder thereof, followed by combining emulsified composition of heat-denatured whey protein solution and edible oil and fat therewith and casing it so that the produced sausage can have the same food texture and juicy feeling as fat when it is heated. Heat-denatured whey protein can react with salts in raw material meat and salt added in production process to become a gel. Alternatively, a gel which can be produced by combining heat-denatured whey protein solution with salt, color fixatives, spices and/or seasonings beforehand can be added thereto.

As whey protein used in the present invention, any of usually available whey proteins can be used. For example, Concentrate by ultrafiltration of protein isolated whey in a process producing dairy products such as cheese and so on. As preferable whey protein, whey protein concentrate (WPC) or whey protein isolate (WPI) can be exemplified.

In the present invention, heat-denatured whey protein is used. As heating conditions of making heat-denatured whey protein, whey protein aqueous solution was adjusted to pH 6.0–9.0 and heated at 55–120° C. for 1–60 minutes. After that, it was cooled to around 0–10° C. When the protein concentration used in the present invention is lower than 1 weight %, gel can not be made sufficiently. On the other hand, when it is higher than 20 weight %, gel will be partially formed during heating to give handling trouble. This method of denaturation can be carried out in the same manner as described in Japanese published unexamined patent application No. 64550/1993. Heat-denatured whey protein solution used for preparation of emulsified composition can be also prepared in the same preparing method as described in Japanese published unexamined patent application No. 64550/1993. Further, heat-denatured whey protein used as solution and one used for emulsified composition can be prepared under the same conditions at the same time. The degree of heat denaturation was described in the above Japanese published unexamined patent application No. 64550/1993. When pH was lower than 6.0 on heating, insoluble precipitate or aggregate of whey protein was formed and, when pH was higher than 9.0, precipitate and harmful compound such as lysinoalanine etc. were formed, which was not preferable. Heating conditions will be different depending on the protein concentration and, usually, can be at a temperature of 55–120° C. for 1–60 minutes. When the protein concentration is high, usually, heating treatment can be preferably carried out at low temperature for a long duration. When the temperature was lower than 55° C., denaturation was not sufficient and, when the temperature was higher than 120° C., scorching or partial gel formation occurred. Neither conditions can be preferable for preparation of the desired heat-denatured whey protein solution. Alternatively, heat-denatured whey protein solution can be made into powder by spray drying or freeze-drying which can be used in the present invention.

The degree of heat denaturation of whey protein can be expressed numerically by determining hydrophobicity thereof. Hydrophobicity of heat-denatured whey protein of the present invention defined as described below (FI/mg protein) can be, preferably, more than 50 FI/mg protein and, more preferably, more than 100 FI/mg protein. Hydrophobicity is represented as fluorescence intensity which is observed by the following procedure per mg of whey protein:

Sample whey protein solution is diluted so that the concentration thereof will be 0.1–0.3 g protein/l, to which 8 mM 1-anilinonaphthalene-8-sulfonic acid is added as fluorescent probe and fluorescence intensity is determined by using excitation wave length of 370 nm and emission wave length of 470 nm with fluorescent spectroscopy. Determination of this degree of heat denaturation can be carried out according to a method described in the above Japanese published unexamined patent application No.64550/1993.

For preparation of emulsified composition, an emulsion comprising 25–75 weight % of edible oil and fat can be obtained by combining edible oil and fat with heat-denatured whey protein solution with ratio of 1:3–3:1. Preferably, the ratio is 1.5:1–2:1. Stirring the mixture with a propeller blade mixer or a TK homomixer etc. can be preferable. When a propeller blade mixer is used, emulsion can be preferably prepared under conditions of 100–1000 rpm, and, more preferably, 600–1000 rpm. When a TK homomixer is used, an emulsion can be preferably prepared under conditions of 100–1200 rpm and, more preferably, 2000–10000 rpm. Emulsification with a high pressure homomixer or emulsification with detergents will make emulsion particle size too small and decrease juicy feeling.

Diameter of emulsion particle is preferably 8–100 μm, more preferably, 10–50 μm for juicy feeling and emulsion's stability. Further, considering juicy feeling, oil and fat having the same or lower melting point as hog fat (28–48° C.) or beef tallow (35–50° C.), that is, edible oil and fat having melting point lower than 50° C. can be preferably used. For example, palm oil, rapeseed oil, corn oil, cacao butter, coconut oil, safflower oil, peanut oil can be used. One kind, or two or more kinds of edible oil and fat can be combined for use.

As for stability of emulsion, time difference between initiation of separation and complete separation when emulsion is kept at higher temperature than melting point of edible oil and fat can be a measure. Because the temperature is usually kept below 10° C. in a production process, it is an essential requirement that it should not be separated until the temperature is cooled below 10° C. and that it should be separated to a certain extent on heating for eating in order to have a juicy feeling.

As an evaluation method of single stability of emulsified composition in the present invention, 5 ml of obtained emulsified composition is placed in a test tube, cooled to 5° C., solidified and, then, heated to 50° C. Separated state thereof is observed then. As a result, emulsion which will be separated by the end of complete cooling is unstable and difficult to handle during production process. Further, edible oil and fat will separate when sausage is heated. On the other hand, emulsion which will not separate even when 120 minutes pass after heating up can not be used in the present invention because it can not be expected to have a juicy feeling on heating for eating.

When the emulsified composition is prepared, emulsifying conditions (combination, temperature, operation methods, etc.) of emulsified composition can be adjusted by determining emulsion's stability and considering juicy feeling of obtained product.

The emulsified composition prepared as described above is cooled immediately and becomes a solid or pasty substance. At that time, if spieces of edible oil and fat and combination ratio is designed so that it will be preferably solidified on cooling, stability during conservation will be excellent.

Then, a method of preparing low fat sausage using emulsified composition combined with this heat-denatured whey protein solution and edible oil and fat will be described.

Low fat sausage of the present invention can be prepared by adding heat-denatured whey protein solution or dried powder thereof and emulsified composition combined with heat-denatured whey protein solution and edible oil and fat for the whole or partial substitution of animal fat such as hog fat or beef tallow etc. used for preparation of known sausage. For example, according to a usual method, sliced hog red meat is cured with 1.2–2% of salt and color fixatives. Then, ground meat thereof is prepared, to which heat-denatured whey protein solution or dried powder thereof is added so that solid base amount of heat-denatured whey protein including usage for emulsified composition to red meat will be 0.1–5 weight %, and, preferably, 0.5–1.5 weight %. In the case of less than 0.1 weight % of solid base amount thereof, yield and meat structure will be adversely affected and, in the case of more than 5 weight % of solid base amount thereof, yield, meat structure and flavor will be adversely affected. Seasoning and/or flavor can be added to heat-denatured whey protein solution unless it will adversely affect meat structure.

After then, cutting it at high speed, ice water, binding agent, spices and seasonings can be added to emulsified composition made from water absorbent, heat-denatured protein solution and edible oil and fat at a ratio of 5–20 weight %, preferably 10–15 weight % so that it will comprise 5–15 weight % of fat. The type of emulsion will not be restricted whether it is W/O or O/W. Seasoning or flavor can be added to emulsified composition unless meat structure thereof will be adversely affected. Then, sausage can be prepared by stuffing it into casing with a stuffer, smoking or not smoking, heating and cooling. If an amount of added emulsified composition is too large, it can not be called as low fat sausage and will be too fatty. On the contrary, if it is too small, meat structure thereof will be hard and crumbly and not have the juicy feeling.

As for the juicy feeling, it was found that sensory juicy feeling was consistent with oil area ratio to total area of filter paper infiltrated by juice(water component and oil component) after loading mechanically on a product (100 g/l sausage) cut with 2 cm thickness when core temperature of boiled Vienna sausage with diameter of 16–22 mm cooled to 60° C. Considering this as substituted characteristic value for juicy feeling, when oil area ratio is 40–85%, sensory juicy feeling is quite satisfactory. It corresponds to 25–50 g/cm$^2$ loading and in the case of Frankfurt sausage or Bologna sausage which is larger than Vienna sausage, it is also determined by loading 25–50 g/cm$^2$. The amount of water added can be adjusted depending on the concentration of heat-denatured whey protein solution.

EXAMPLES

The present invention will be described in more detail by the illustrative examples as below but they will not limit the scope of the present invention.

Example 1

(1) Preparation of Heat-Denatured Whey Protein Solution

Whey protein isolate (WPI, Taiyo-kagaku (co., Ltd.), SunlactoI-1, protein content; 89.9%, ashes; 1.34%) (200 g) was dissolved in 1800 g of deionized water to prepare 10% of WPI solution (protein concentration; 9%, ashes; 0.13%, pH7). This WPI solution was heated by stirring in a hot water bath and kept at 80° C. for 30 minutes. Then, it was cooled to 5° C. in an ice water bath or, 55° C. when it was immediately used, to give heat-denatured whey protein solution. Hydrophobicity of this whey protein was 95 FI/g protein.

(2) Preparation of Emulsified Composition from Heat-Denatured Whey Protein Solution and Edible Oil and Fat Heat-denatured whey protein solution (500 g) obtained in the aforementioned (1) and kept at 55° C. and palm oil (900 g) kept at 55° C. were combined and stirred with a propeller mixer (600 rpm) and prepare emulsified composition, wherein average diameter of emulsion particle is 12 μm, which was taken on a tray and suddenly cooled to 5° C. to give emulsified composition.

(3) Preparation of Sausage

Red pork (5.5 kg) was ground with a meat grinder and the whole amount thereof was put in a silent cutter. Then, 1 kg of heat-denatured whey protein solution prepared in the present example (1) was added thereto(solid base 1.0 weight % of whey protein to red pork meat) and, cutting at high speed, 1.36 kg of ice water, 140 g of salt, 20 g of phosphate, 0.8 g of nitrite, 66 g of seasoning, 150 g of water absorbent such as starch etc. and 1.40 kg of emulsified composition prepared in the present example (2) were added to give pasty meat for sausage. This pasty meat for sausage was stuffed in a casing (diameter thereof was 25 cm), smothered until core temperature thereof became 70° C. and cooled to give low fat sausage.

Comparative Example 1

Red pork (5.5 kg) was ground with a meat grinder and the whole amount thereof was put in a silent cutter. Then, 2.4 kg of heat-denatured whey protein solution prepared in the present example (1) was added thereto (solid base 2.4 weight % of whey protein to red pork meat) and, cutting at high peed, 1.36 kg of ice water, 140 g of salt, 20 g of phosphate, 0.8 g of nitrite, 66 g of seasoning, 150 g of water absorbent such as starch etc. and 1.40 kg of emulsified composition prepared in the present example (2) were added to give pasty substance. This pasty substance was stuffed in a casing, smothered until core temperature thereof became 70° C. and cooled to give low fat sausage of comparative example 1.

Control Group

Red pork (5.5 kg) was ground with a meat grinder and the whole amount thereof was put in a silent cutter. Then, cutting at high speed, 1.36 kg of ice water, 140 g of salt, 20 g of phosphate, 0.8 g of nitrite, 66 g of seasoning, 150 g of water absorbent such as starch etc. were mixed and 2.4 kg of hog fat ground by a meat grinder was added thereto and kept cutting it to give pasty substance. This pasty substance was stuffed in a casing, smothered until core temperature thereof became 70° C. and cooled to give sausage of control group.

Figure 1:
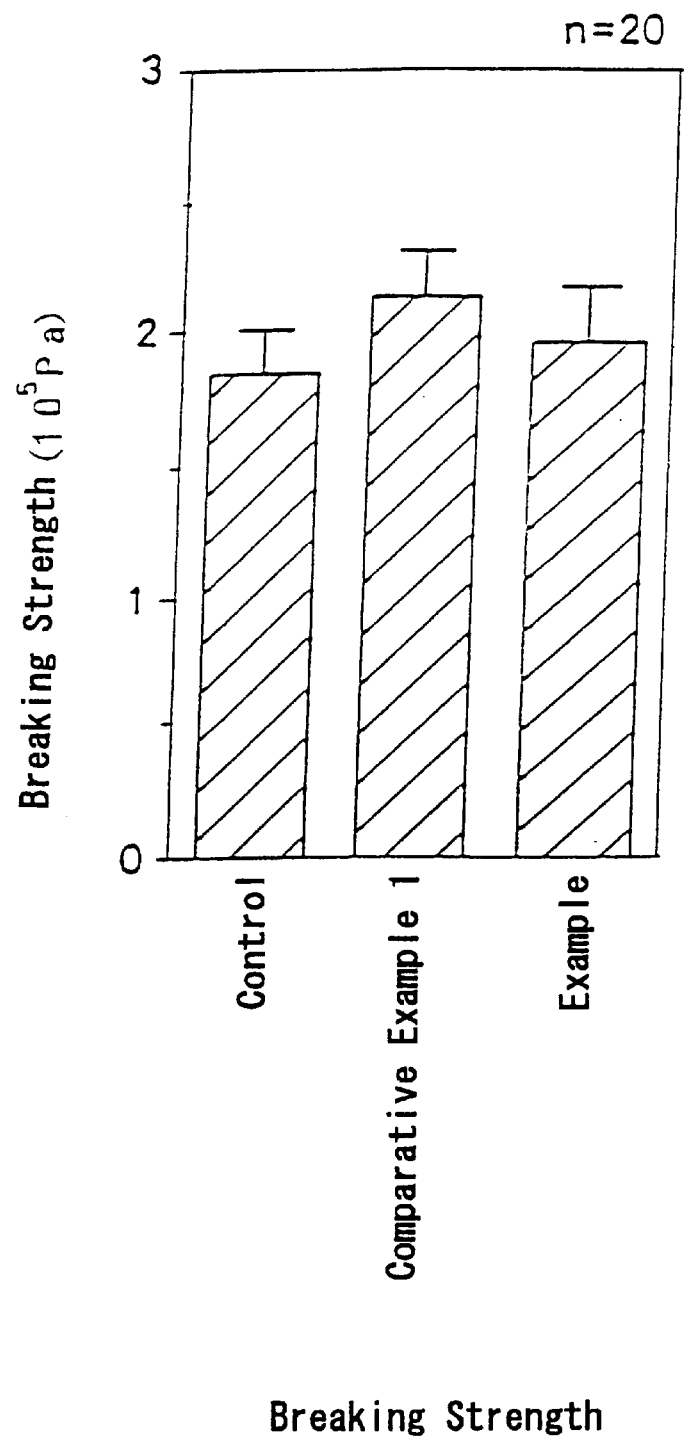
FIG. 1 exhibits a graph which compares breaking strength of low fat sausage in the examples of the present invention with that of sausage in comparative example 1 and that of sausage in the control group.
Figure 2:
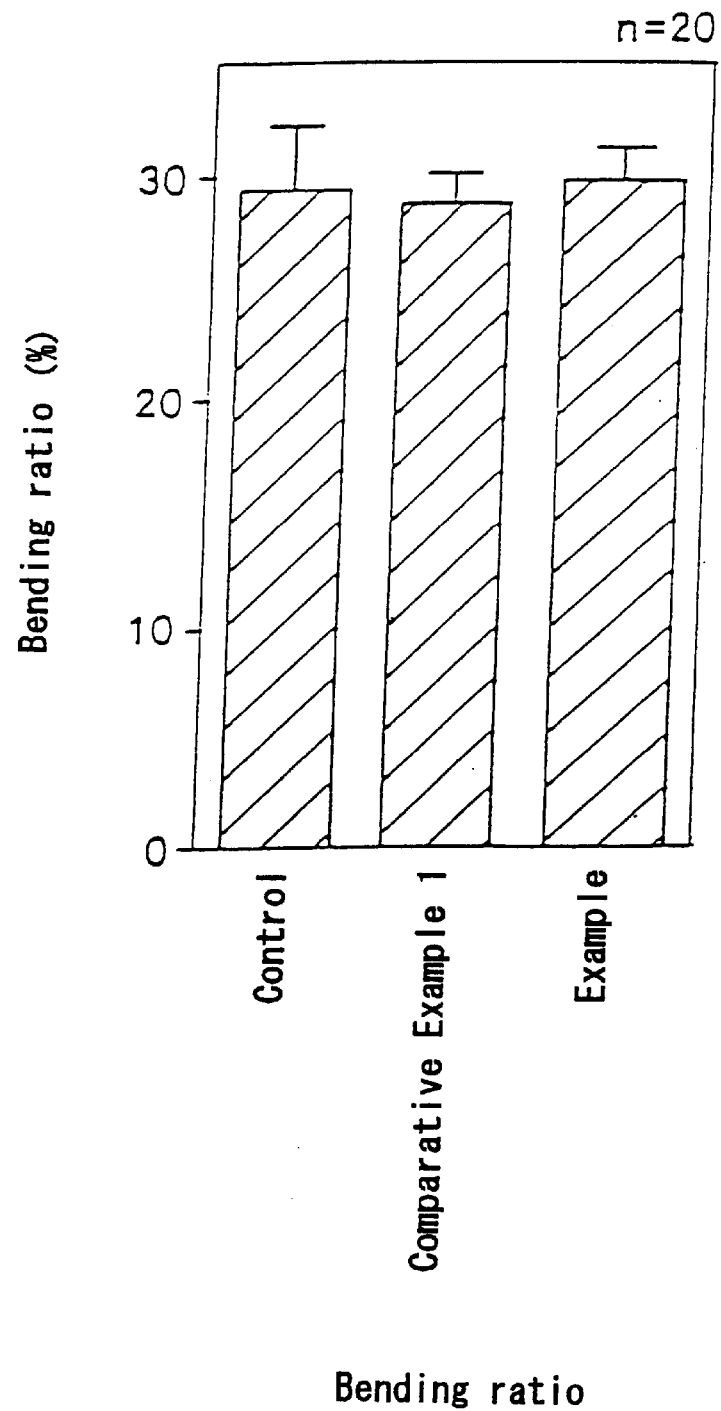
FIG. 2 exhibits a graph which compares bending ratio of low fat sausage in the example of the present invention with that of sausage in a comparative example and that of sausage in the control group.

Physical properties of sausage of control group, example 1 and comparative example 1 were exhibited in FIG. 1 and FIG. 2.

As exhibited in FIG. 1, breaking strength of sausage of example 1 and that of sausage of comparative example 1 were higher than that of sausage of control group, which showed that both of sausage of example 1 and sausage of comparative example had a hardness equal to or more than that of control group. However, as exhibited in FIG. 2, bending ratio of sausage of comparative example 1 was lower than that of either of sausage of control group or example 1. Accordingly, breaking bending of sausage of comparative example 1 was so small that the sausage had brittle and crumbly meat structure. On the other hand, sausage of example 1 had the same meat structure as that of control group.

Comparative Example 2

Emulsified composition with emulsion particle diameter of 6.7 μm prepared by mixing further emulsified composition obtained example 1 (2) in a high pressure homomixer under 50 kg/Hg were taken on a trey, cooled rapidly to 5° C. to give emulsified composition, which was used in place of emulsified composition of example 1 (2) to prepare sausage of comparative example 2 according to example 1 (3).

Comparative Example 3

Emulsified composition prepared by combining the same substances as in example 1 (2), emulsifying it with TK homomixer at 7000 rpm for 3 minutes so that diameter of emulsion particle would be 7.7 μm, taking it on a tray and rapidly cooled to 5° C. was used in place of emulsified composition to prepare sausage of comparative example 3 according to example 1 (3).

The results of sensory evaluation of juicy feeling of sausage of control group, example 1, comparative example 1, comparative example 2 and comparative example 3 were exhibited in table 1. In sensory evaluation, a number of person including 15 men and 15 women who ate each cooked sausage and felt it the most juicy among 5 kinds of sausage was represented.

TABLE 1

| | Number of person who felt it the most juicy (person) | | | |
|---|---|---|---|---|
| Example 1. | example 1 comp. | example 2 comp. | example 3 comp. | control gr. |
| 12 | 0 | 1 | 4 | 23 |

Sausage produced from emulsified composition made with a propeller mixer (example) had the same juicy feeling as usual sausage comprising more than 20% of fat (control group). As substituted characteristic value for juicy feeling, oil area ratio to total area of filter paper infiltrated by juice (water component and oil component) was measured after loading mechanically on a product (100 g/l sausage) cut with 2 cm thickness when core temperature of boiled product cooled to 60° C. Oil area ratio of example product was 40–85% and sensory juicy feeling thereof was satisfactory as much as that of control product made by the conventional method (FIG. 3 and table 1).

Stability of emulsified composition (time passed until initiation of separation on being kept at 50° C.) of comparative example 2 (high pressure homomixer 50 kg/Hg), that of comparative example 3 (TK homomixer, 7000 rpm, 3 minutes) and that of example (propeller mixer) were determined (FIG. 4).

As the results, it was found that emulsification with a propeller mixer was preferable for appropriate separation as time passed.

Industrial Usefulness

An object of the present invention is to provide a novel low fat sausage and a preparing method thereof. Sausage of the present invention is prepared by using heat-denatured whey protein and emulsified composition comprising heat-denatured whey protein solution and edible oil and fat in place of hog fat and/or beef tallow so that it can have the same juicy feeling as conventional fatty sausage. Thus the present invention can provide low fat sausage with an excellent flavor, which will be quite useful for prevention of obesity and diseases of adult people and for foods for those patients. In addition, it can be used for balanced foods which recently attract public notice because their balance of fatty acid can be controlled(ratio of saturated one, mono-ene unsaturated one and/or polyunsaturated one: choice of edible oil and fat used).

We claim:

1. A method of preparing a low fat sausage having a juicy feeling which comprises adding heat-denatured whey protein and an emulsified composition thereof to comminuted red meat as the sausage raw material, wherein, (a) said emulsified composition is obtained by combining heat-denatured whey protein, and edible oil and fat, and has a particle size of 8–100 μm in diameter, (b) the amount of emulsified composition as the fat component to the total amount of sausage is 5–15 weight percent, and, (c) the whey protein has a hydrophobicity of at least 50 FI/mg protein.

2. The method of preparing sausage according to claim 1, wherein said heat-denatured whey protein is prepared by the following procedure:

whey protein is dissolved in water so that the concentration thereof is 1–20 weight %, which is adjusted at pH 6–9 and heated at 55–120° C. for 1–60 minutes and, optionally, dried to become powder.

3. The method of preparing sausage according to claim 1, wherein 0.1–5 weight % of said heat-denatured whey protein is used as solid base to total amount of said red meat as sausage raw material.

4. The method of preparing sausage according to claim 1, wherein said emulsified composition comprises 25–75 weight % of edible oil and fat.

5. The method of preparing sausage according to claim 1, wherein said edible oil and fat is at least one oil and fat selected from a group of fats having melting point lower than 50° C.

6. The method of preparing sausage according to claim 1, wherein said emulsified composition has emulsion stability characterized by initiating separation within 120 minutes on being kept at 50° C.

7. The method of preparing sausage according to claim 1, wherein said emulsified composition is prepared by emulsifying heat-denatured whey protein and edible oil and fat at 100–1000 rpm with a propeller blade mixer.

8. The method of preparing sausage according to claim 1, wherein said emulsified composition is prepared by emulsifying heat-denatured whey protein and edible oil and fat at 100–1200 rpm with TK homomixer.

* * * * *